W. A. TURBAYNE.
ELECTRICAL SYSTEM OF DISTRIBUTION.
APPLICATION FILED FEB. 15, 1913. RENEWED SEPT. 19, 1917.
1,265,000.
Patented May 7, 1918.
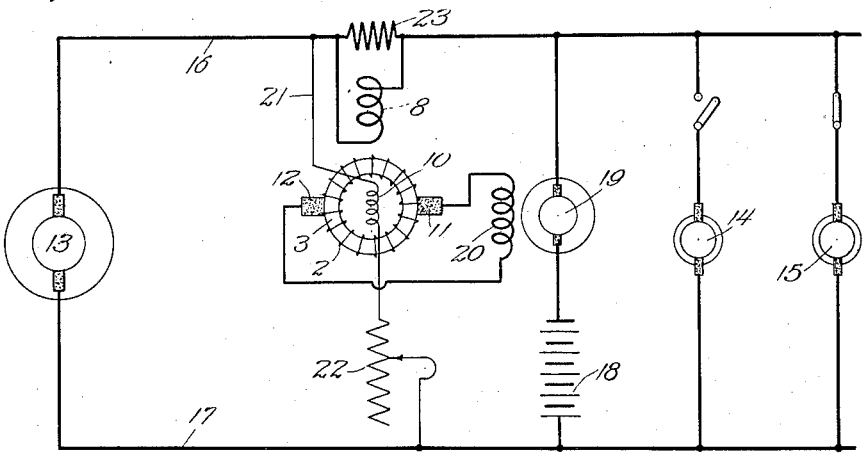
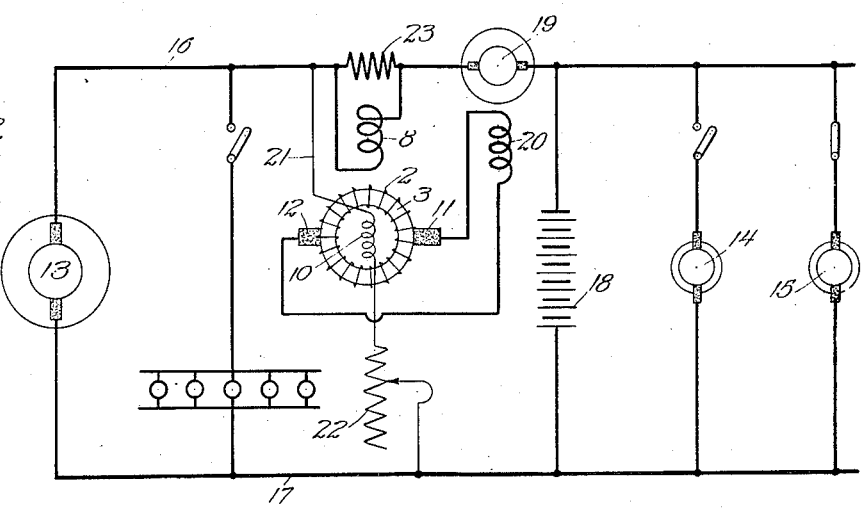
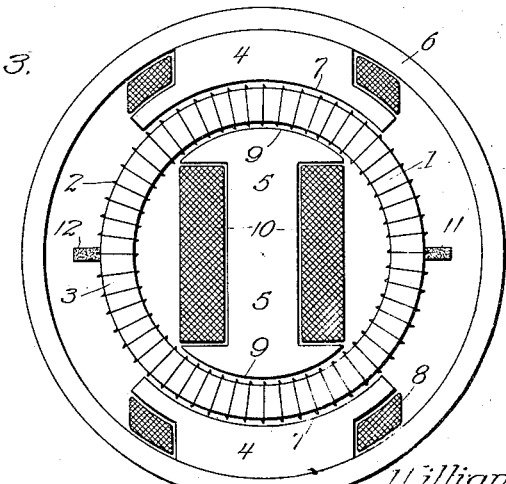

UNITED STATES PATENT OFFICE.

WILLIAM A. TURBAYNE, OF NIAGARA FALLS, NEW YORK, ASSIGNOR, BY MESNE ASSIGN-MENTS, TO U. S. LIGHT & HEAT CORPORATION, OF NIAGARA FALLS, NEW YORK, A CORPORATION OF NEW YORK.

ELECTRICAL SYSTEM OF DISTRIBUTION.

1,265,000.  Specification of Letters Patent.  Patented May 7, 1918.

Application filed February 15, 1913, Serial No. 748,662. Renewed September 19, 1917. Serial No. 192,227.

*To all whom it may concern:*

Be it known that I, WILLIAM A. TURBAYNE, a citizen of the United States, residing at Niagara Falls, in the county of Niagara and State of New York, have invented new and useful Improvements in Electrical Systems of Distribution, of which the following is a full, clear, concise, and exact description, reference being had to the accompanying drawing, forming a part of this specification.

My invention relates to improvements in electrical systems of distribution.

In many electrical systems of distribution it is customary to provide a main source of current and to employ therewith, as an auxiliary source, a storage battery. In such a system a regulating generator or booster is employed to control the division of load between the main source and the auxiliary source.

In these systems, especially in the larger installations, difficulties have been encountered due to the sluggishness of operation of the regulating generator or booster.

While adapted for use in many other systems, this invention is especially adapted for use in a system of the type above described.

An object of the invention is to provide a system in which the regulating action is exceptionally quick.

Another object is to provide a system which may be readily controlled.

Another object is to provide a novel type of booster or booster exciter which is quick to respond to circuit conditions.

Another object is to provide a novel type of booster or booster exciter which may be readily controlled.

The above, and other, objects may be obtained by the system diagrammatically illustrated in the accompanying drawings, in which:

Figure 1 illustrates a regulating system adapted to maintain practically constant generator output.

Fig. 2 illustrates a modified arrangement in which the generator current is maintained substantially constant.

Fig. 3 illustrates diagrammatically the booster or booster exciter.

The novel machine here employed is of the type disclosed in my copending applications, Serial Nos. 738,629 and 739,433.

For simplicity in explanation the machine has been illustrated as of the bipolar form, although it is apparent that the device may be constructed in the multipolar form having any desired number of pairs of field poles.

In Fig. 3 the armature 1 is of the ring type of the well-known Gramme or Pacinotti form, in which suitable windings 2 pass completely around a laminated ring 3.

The field is provided with field poles 4 external to said armature and field poles 5 internal to said armature.

The poles 4 project from the circular field yoke 6 and are provided with pole faces 7 closely adjacent the external turns of the armature and with windings 8.

The internal field poles 5 are provided with pole faces 9 closely adjacent the internal turns of the armature and with windings 10.

Both external and internal poles are fixed and are arranged with an internal pole opposite each external pole.

The armature conductors are connected to a commutator (not shown) in the usual manner. Brushes 11 and 12 are adapted to bear on the commutator.

In a machine of this type if the external and internal poles are magnetized in the same sense,—that is, if adjacent external and internal poles are of the same polarity, both external and internal armature turns will, upon rotation, generate E. M. F.'s in the same direction and the sum of the E. M. F.'s thus induced will be effective at the brushes.

If, however, one set of field poles is reversed, preferably the outer poles, magnetic flux will be diverted from the armature core and the external armature conductors cutting through this diverted flux will develop an E. M. F. opposed to the E. M. F. developed in the inner armature conductors.

If the magnetizing effect of the external field poles is exactly equal to the magnetizing effect of the internal poles, all flux will be diverted from the armature core and the external armature conductors will develop an E. M. F. exactly equal and opposed to that developed by the internal armature conductors so that the voltage across the brushes will be reduced to zero.

Regulation in a machine of this type is obtained without changing the direction or magnitude of the flux set up in the inner poles. The effect of the outer poles is simply to divert more or less of the flux from the armature core to the external magnet frame. Consequently, current and flux being in absolute phase relation, variations in current through the external field will cause an immediate response in the voltage of the machine.

In the usual booster or exciter the regulating windings, both series and shunt, are placed on the same poles and the flux throughout the complete magnet system must be varied to cause a variation in voltage at the brushes. This variation in flux develops a voltage in the shunt winding connected across the system which opposes the flow of current therein and acts to retard the change in flux so that the booster or exciter is sluggish in action and difficult to control. The disadvantages arising from such conditions are very pronounced in systems where very heavy loads are apt to be thrown suddenly on the line, requiring the booster to respond to cause the battery to immediately meet the overload to prevent its injuriously affecting the generator.

Fig. 1 illustrates a system in which a booster is arranged in the battery branch. The booster field is supplied by the novel form of exciter above described in such manner as to hold the generator output substantially constant regardless of extreme variations of load on the work circuits.

In this system a generator 13 of any desired type supplies a variable load represented by the motors 14 and 15, through leads 16 and 17. A compensating battery 18 is connected across the leads 16 and 17. A booster armature 19 is connected in one of the battery leads. The field 20 of the booster is connected across the brushes 11 and 12 of the exciter. The internal field windings 10 of the exciter are connected by the conductor 21 across the generator leads through a variable resistance 22. The external field windings 8 are connected across a shunt 23 in the main lead 16 and are, therefore, responsive to variations in current in the generator circuit. The tendency of field windings 10 is to develop an E. M. F. across the brushes of the exciter to cause a current in the booster field in a direction to charge the battery. The tendency of field windings 8 is to develop an E. M. F. across the exciter brushes to cause a current in the booster field in a direction to discharge the battery. With both field windings 8 and 10 energized the voltage across the exciter brushes will be equal to the algebraic sum of the effects of the windings separately, so that at some predetermined current through winding 8 the exciter voltage will be reduced to zero. Under such conditions no booster voltage will be developed to charge or discharge the battery and the battery will simply float across the line. By adjustment of the variable resistance 22 the energization of field winding 10 may be so regulated that at any predetermined generator output the effect of winding 8 will exactly cancel the effect of winding 10.

If now the current demanded by the translating devices exceeds this predetermined normal generator output, coil 8 will preponderate and the exciter will cause a booster voltage to be developed which will cause the battery to discharge to meet the excess demand. On the other hand, if the demand of the load circuit drops below the normal value desired to be held on the generator, coil 10 will preponderate and the exciter will cause the booster voltage to be developed, which will cause the battery to receive a charge from the line so that the load on the generator will remain practically constant.

By this system the load on the generator will always remain constant within the variation between certain predetermined limits, which variation is effective through coil 8 to cause regulation.

Fig. 2 illustrates a booster system in which it is desired that the current through the booster armature 19 shall be held to a constant value within the desired limits predetermined by the required closeness of regulation. In this system the booster field is supplied by the exciter and the exciter windings are connected as described in Fig. 1. The preponderance of coil 10 is arranged to cause a booster voltage to be added to that of the generator, and therefore, tending to cause charging current to enter the battery, while a preponderance of coil 8 will act in the opposite direction to cause the booster voltage to oppose the generator voltage and permit the battery to discharge. At the desired predetemined load the effects of coil 8 will exactly equalize the effects of coil 10 so that no booster voltage will be developed and the battery will float across the line, assuming, of course, that the number of cells chosen for the battery is such that the floating voltage is exactly equal to the normal line voltage.

In the case of an increased demand by the translating devices, the generator will tend to supply this demand, causing an increase of current through coil 8. This will immediately result in the exciter so energizing the booster field as to cause a booster voltage opposing that of the generator and thereby causing reduction in voltage across the work circuit beyond the booster so that the battery will discharge to meet the extra demand.

If the demand of the translating devices drops below the predetermined normal value, coil 10 will preponderate and the exciter will so energize the booster field as to add the booster voltage to the voltage across the work circuit, thereby causing the battery to charge.

Two preferred arrangements have been illustrated and described for the purpose of demonstrating the operation of this system but these arrangements are merely illustrative, it being apparent that many modifications may be made therein which clearly fall within the scope of the invention.

What I claim as new and desire to secure by Letters Patent is:

1. In an electrical system of distribution, a load circuit, a main source of current, an auxiliary source of current, and a regulating generator for determining the proportion of load on each source, said generator having means tending to produce a field of uniform polarity and magnitude and a winding diverting a varying flux from said field.

2. In an electrical system of distribution, a load circuit, a main source of current, an auxiliary source of current, and a booster for determining the proportion of load carried by each source, said booster having means tending to produce a field of predetermined polarity and magnitude and a winding responsive to conditions in said load circuit acting to divert flux from said field.

3. In an electrical system of distribution, a load circuit, a generator for supplying current thereto, an auxiliary source of current, and a regulating generator for determining the proportion of load on each source, said regulating generator having a rotatable armature, two sets of field poles, one set setting up a flux of uniform direction and magnitude and the other set of field poles varying responsive to conditions in said load circuit and acting to divert flux set up by said first set of field poles from the armature.

4. In an electrical system of distribution, a load circuit, a main source of supply therefor, a storage battery in circuit therewith, and means for controlling the charge and discharge of said storage battery, said means including a regulating generator having a set of field poles with windings thereon connected across a source of constant polarity and substantially constant potential, additional field poles adjacent to said first field poles, windings on said additional field poles arranged to make each of said additional poles of unlike polarity to the adjacent one of said first mentioned poles, the energization of the windings on said additional poles varying in response to variations in electrical conditions in said circuit whereby said additional poles may divert a variable amount of flux from said first poles from the armature of said generator.

5. In a system of distribution, a load circuit, a regulating generator provided with a ring-wound armature, field poles adjacent the internal armature conductors setting up a flux of uniform direction and magnitude, and field poles adjacent the external armature conductors having windings acting under predetermined conditions to divert the flux set up by the internal field from the armature in response to variations in load conditions in said load circuit.

6. In an electrical system of distribution, a load circuit, and a regulating generator, said generator being provided with a ring-wound armature, internal field poles adjacent the inner armature conductors, windings on said poles connected across the system, external field poles adjacent the outer armature conductors, and windings on said external poles energized in proportion to current in the main line, said external poles acting to divert flux from the armature set up by said internal poles.

7. In an electrical system of distribution, a main generator, a load circuit, a storage battery connected across the load circuit, a regulating generator for regulating the charge and discharge of said battery, said regulating generator comprising a ring-wound armature, internal field poles with polar faces adjacent the inner armature conductors, windings on said field poles connected across the generator leads through a variable resistance, external field poles provided with polar faces adjacent the outer armature conductors, and windings on said external field poles in shunt to a resistance in the main line, one internal field pole being opposite each external field pole adjacent internal and external poles being of opposite polarity, whereby variations in energization of said external field poles may control the diversion of flux set up in the armature core by said internal field poles.

8. In an electrical system of distribution, a main generator, a load circuit, a storage battery connected across the load circuit, a booster in series with the battery, an exciter for said booster, said exciter comprising a ring-wound armature, internal field poles having polar faces adjacent the internal armature conductors, windings on said field poles connected across the generator leads through a variable resistance, external field poles having polar faces adjacent the outer armature conductors, and windings on said external field poles energized proportionately to the current from said generator, one internal field pole being opposite each external field pole adjacent internal and external poles being of unlike polarity, whereby variations in generator current may control the diversion of flux set up in the armature core by said internal field poles.

9. In an electrical system of distribution, a main generator, a load circuit, a storage battery connected across the load circuit, a booster connected in the main line between the generator and storage battery, and a booster exciter, said exciter comprising a ring-wound armature, internal field poles tending to set up a flux in said armature of uniform direction and magnitude, and an external field pole arranged opposite each internal field pole opposite internal and external poles being of unlike polarity, said external field poles being energized in response to the current from said generator, whereby variations in energization of said external field poles may control the diversion of flux from said armature core to cause the booster to aid or oppose the main generator.

10. In a booster system, a booster exciter provided with a ring wound armature, an internal field of uniform strength and polarity, and an external field varying in response to circuit conditions, a pole of the external field being opposite each pole of the internal field and of opposite polarity thereto, whereby flux set up in the armature core by said internal field may be diverted from said armature core in response to variations in the energization of the external field.

In witness whereof, I have hereunto subscribed my name in the presence of two witnesses.

WILLIAM A. TURBAYNE.

Witnesses:
WM. G. DAVIS,
JAMES L. COUGHLIN.